(12) United States Patent
Lee

(10) Patent No.: US 9,170,734 B2
(45) Date of Patent: Oct. 27, 2015

(54) MULTIPLE-INPUT HANDWRITING RECOGNITION SYSTEM AND MEASURE THEREOF

(71) Applicants: Inventec Appliances (Pudong) Corporation, Shanghai (CN); INVENTEC APPLIANCES CORP., New Taipei (TW); INVENTEC APPLIANCES (SHANGHAI) CO.,LTD., Shanghai (CN)

(72) Inventor: Chia Chung Lee, Shanghai (CN)

(73) Assignees: INVENTEC APPLIANCES (PUDONG) CORPORATION, Shanghai (CN); INVENTEC APPLIANCES CORP., New Taipei (TW); INVENTEC APPLIANCES (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 14/167,410

(22) Filed: Jan. 29, 2014

(65) Prior Publication Data

US 2014/0219565 A1 Aug. 7, 2014

(30) Foreign Application Priority Data

Feb. 4, 2013 (CN) .......................... 2013 1 0043886

(51) Int. Cl.
*G06K 9/00* (2006.01)
*G06F 3/0488* (2013.01)

(52) U.S. Cl.
CPC ................... *G06F 3/04883* (2013.01)

(58) Field of Classification Search
CPC ..... G06F 3/04883; G06F 3/041; G06F 3/033; G06F 3/03545; G09G 5/00; G06K 9/22; G06K 9/222
See application file for complete search history.

(56) References Cited

U.S. PATENT DOCUMENTS

| 2004/0263486 | A1* | 12/2004 | Seni | 345/173 |
| 2007/0040812 | A1* | 2/2007 | Tang et al. | 345/173 |
| 2013/0201133 | A1* | 8/2013 | Oh | 345/173 |
| 2014/0219565 | A1* | 8/2014 | Lee | 382/189 |

* cited by examiner

*Primary Examiner* — Amir Alavi
(74) *Attorney, Agent, or Firm* — Muncy, Geissler, Olds & Lowe P.C.

(57) ABSTRACT

Disclosed is a handwriting recognition system with a plurality of input modes, including a storage unit, a touch screen display unit, and a processing unit. The storage unit stores character fonts; each of the character fonts corresponds to at least one of the input modes. The touch screen display unit includes an input panel having at least two input areas located thereon; each of the areas inputs data in one of the input modes. The processing unit judges an input set of touch signals to recognize a character input by handwriting in one of the input modes, according to a position on which one of the input areas, which position corresponds to at least one of the set of touch signals. The character is represented by the set of touch signals. A handwriting recognition method applicable to an electronic apparatus with a plurality of input modes is also provided.

9 Claims, 9 Drawing Sheets

MULTIPLE-INPUT HANDWRITING RECOGNITION SYSTEM AND MEASURE THEREOF

CROSS-REFERENCE TO RELATED APPLICATION

This application claims the benefit of China Patent Application No. 201310043886.3, filed on Feb. 4, 2013, in the State Intellectual Property Office, the disclosure of which is incorporated herein its entirety by reference

BACKGROUND OF THE INVENTION

1. Field of the Invention

The present invention generally relates to a multiple-input handwriting recognition system and measure thereof, in particular with respect to different input areas collate with different input modes so as to provide a multiple-input handwriting recognition system and measure thereof in an interface.

2. Description of the Related Art

According to the touch tester, the current touch panels generally comprise capacitive, resistive, electromagnetic, pressure, conductive, surface acoustic wave, ultrasonic, optical and so on and so forth. The common types, resistive and capacitive touch panels are mainly applicable to the consumer electronics, such as laptop, tablet, and personal digital assistant and so on, and the usage thereof is to move on the touch panel through a stylus or fingers so as to input characters by handwriting or simulate the click of mouse.

As far as the existing handwriting input modes are concerned, in case the user desires to input characters in different languages, such as English and Chinese, the switch between the input modes are inevitable. This does not only result in inconvenience, but also waste time. As a result, the inventor invented a handwriting input mode, which recognizes the characters input by the user through different input modes. However, the way the technology actves the different input modes in the meantime to conduct judging the character fonts does not only need a complex algorithm, but also result in lower recognition rate in recognizing different languages, such as Chinese character font, English character font and symbol font.

SUMMARY OF THE INVENTION

In view of the above problems, an objective of the present invention is to provide a handwriting recognition system and a handwriting recognition method, in which different input modes are set corresponding to different input areas on an input panel, and according to the position on which one of the input areas, one of the input modes can be activated for recognizing a character input by handwriting, thereby improving efficiency of handwriting recognition.

The present invention provides a handwriting recognition system with a plurality of input modes which includes a storage unit for storing a plurality of character fonts, each of the character fonts corresponds to at least one of the input modes; a touch screen display unit includes an input panel having at least two input areas located thereon, and each of the areas is for inputting data in one of the input modes; and a processing unit is configured to conduct judging an input set of touch signals to recognize a character input by handwriting in one of the input modes, according to a position on which one of the input areas, which position corresponds to at least one of the set of touch signals, and the character is represented by the set of touch signals. A handwriting recognition method applicable to an electronic apparatus with a plurality of input modes is also provided.

In an embodiment, the character fonts include a Chinese character font, an uppercase English letter font, a lowercase English letter font, a numeral font, or a symbol font.

In an embodiment, said at least one touch signal is first in the set of touch signals.

In an embodiment, the processing unit is configured to recognize a character according to positions on which of the input areas, with the positions corresponding to at least a plurality among the set of touch signals.

In an embodiment, the touch screen display unit further includes a display panel, and the processing unit is configured to conduct displaying at least one of the recognized characters, upon recognizing the characters, on the display panel in an order of descending frequencies respectively with which the characters were input.

The present invention also provides a handwriting recognition method applicable to an electronic apparatus with a plurality of input modes. The electronic apparatus has a storage unit and a touch screen display unit. The storage unit is for storing a plurality of character fonts, and each of the character fonts corresponds to at least one of the input modes. The touch display unit has at least two input areas, and each of the areas is for inputting data in one of the input modes. The handwriting recognition method includes: receiving an input set of touch signals at the touch screen display unit; and judging an input set of touch signals to recognize a character input by handwriting in one of the input modes, according to a position on which of the input areas, which position corresponds to at least one of the set of touch signals, wherein the character is represented by the set of touch signals.

DETAILED DESCRIPTION OF THE PREFERRED EMBODIMENTS

Hereinafter, embodiments of the present invention will be described in detail with reference to the accompanying drawings so that those skilled in the art to which the present invention pertains can realize the present invention. As those skilled in the art would realize, the described embodiments may be modified in various different ways, all without departing from the spirit or scope of the present invention.

Figure 1:
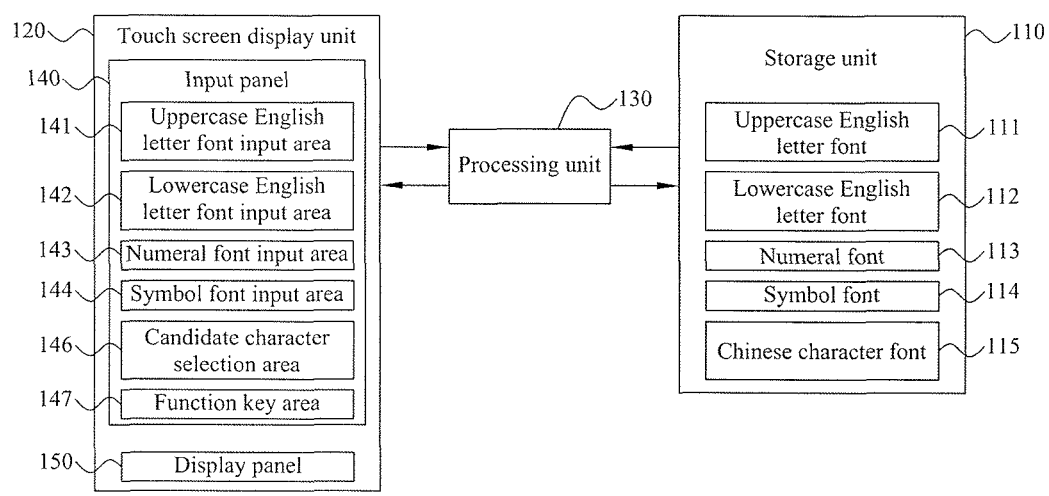
FIG. 1 is a block diagram of elements of a handwriting recognition system with a plurality of input modes according to the present invention.
Figure 2:
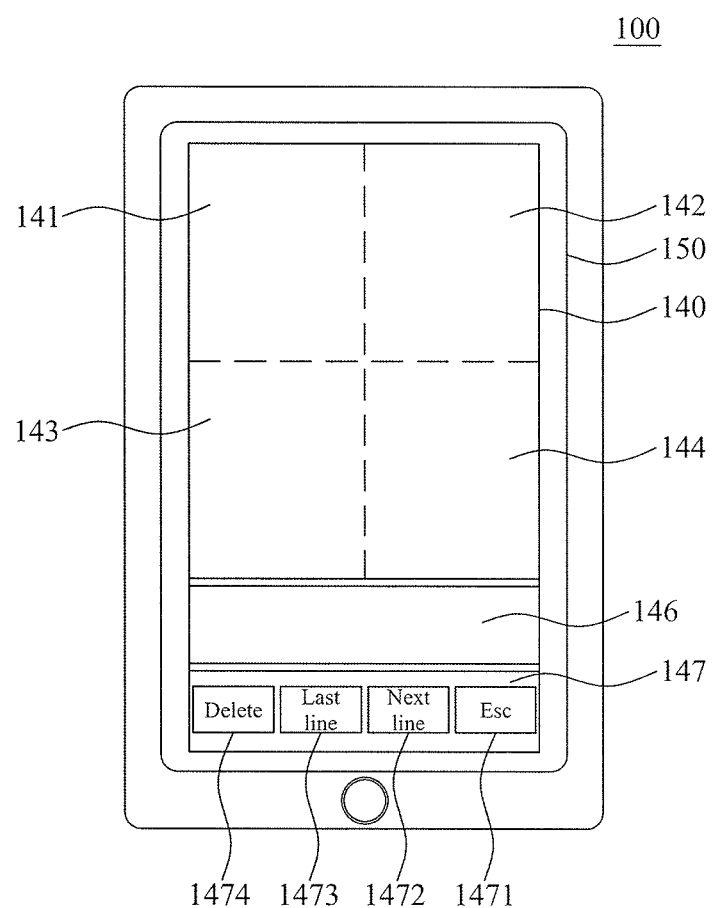
FIG. 2 is a schematic view of an appearance of a tablet according to the present invention.

With reference to FIGS. 1 and 2, FIG. 1 is a block diagram of elements of a handwriting recognition system with a plurality of input modes according to the present invention, and FIG. 2 is a schematic view of an appearance of a tablet according to the present invention. The handwriting recognition system with a plurality of input modes of the present invention takes a tablet as an example for explaining, but shall not subject to this restriction. A cell phone, camera or any electronics with touch function can also be included.

With reference to FIG. 1, the handwriting recognition system with a plurality of input modes comprises a storage unit 110, a touch screen display unit 120 and a processing unit 130. According to an embodiment of the present invention, the storage unit 110 stores an uppercase English letter font 111, a lowercase English letter font 112, a numeral font 113, or a symbol font 114 and a Chinese character font 115, and each of character fonts respectively corresponds to an input modes. According to an embodiment of the present invention, the storage unit 110 takes the aforementioned character fonts as examples, but shall not subject to this restriction. In addition, the preceding input mode belongs to an input mode which is applicable for recognizing any characters in each languages input by the user.

The touch screen display unit 120 comprises an input panel 140 and a display panel 150. The input panel 140 can be capacitive, resistive, electromagnetic, optical or sonic, and has at least two input areas. According to an embodiment of the present invention, the input panel 140 takes an uppercase English letter font input area 141, a lowercase English letter font input area 142, a numeral font input area 143 and a symbol font input area 144 as examples. Wherein, the uppercase English letter font input area 141 corresponds to the uppercase English letter font 111, the lowercase English letter font input area 142 corresponds to the lowercase English letter font 112, the numeral font input area 143 corresponds to the numeral font 113 and the symbol font input area 144 corresponds to the symbol font 114, and the arrangements for each input areas along with the corresponding input modes thereof shall not subject to this restriction; each input areas can be divided according to the habit of the user as well as to set the input modes corresponding to each input areas respectively.

Figure 3A:
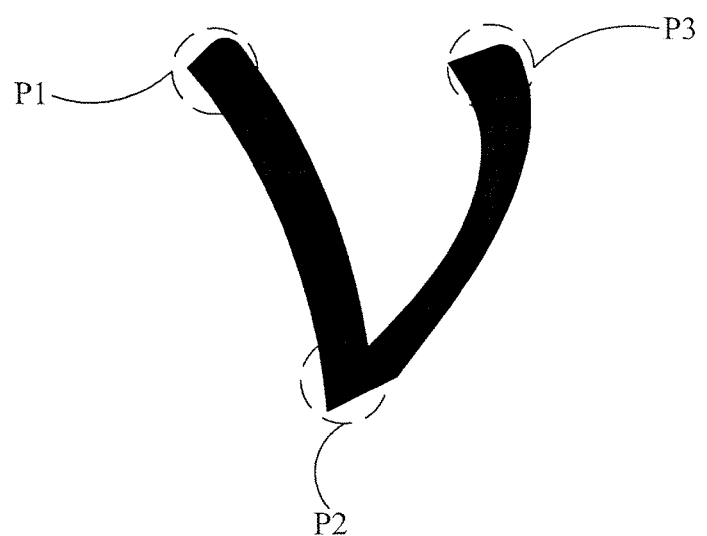
FIG. 3A is a schematic view of "V" of a handwritten character font.

With reference to FIG. 3A for a schematic view of "v" of a handwritten character font, when the user desires to input a character font, he/she can conduct writing on the input panel 140 by fingers or a stylus, so that the input panel 140 can obtain a set of touch signals S (not shown), and the set of touch signals S comprise at least one ouch signal. Take the handwritten character font "v" as example, it at least produces an initial point p1, a turning point p2 and an ending point p3, and the set of touch signals S at least comprise the signals of p1-p3. The processing unit 130 conducts judging an input set of touch signals to recognize a character input by handwriting in one of the input modes, according to a position on which of the input areas 141-144, with the position corresponding to at least one of the set of touch signals S, and the character being represented by the set of touch signals.

Figure 3B:
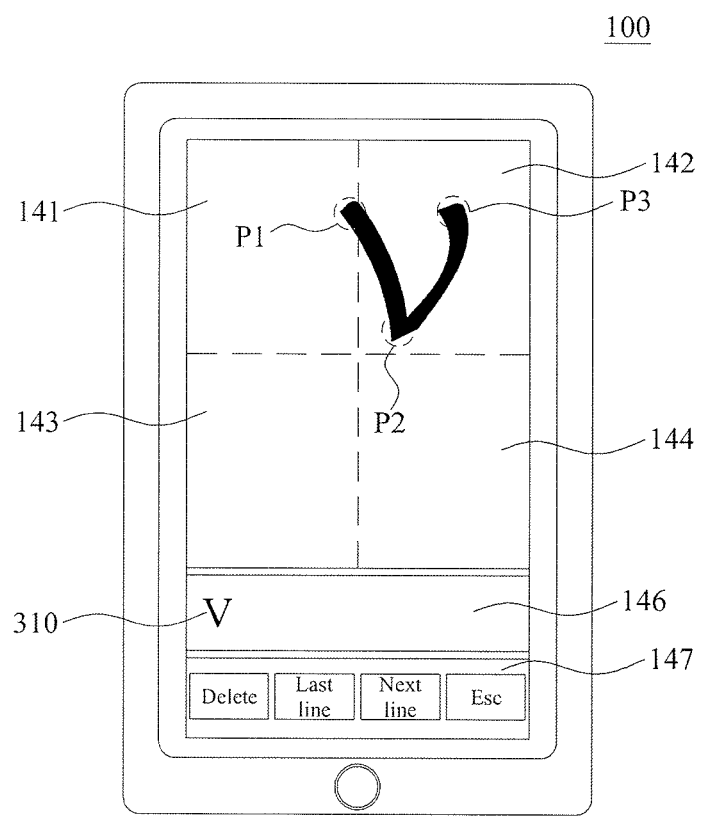
FIG. 3B is an analog view of "v" of character font according to an embodiment.

With reference to FIG. 3B for an analog view of "v" of character font according to an embodiment of the present invention, the processing unit 130 recognizes the character according to positions on which of the input areas, with the positions corresponding to at least a plurality among the set of touch signals S, and the set of touch signals S has the biggest proportion in the lowercase English letter font input area 142. As a result, the processing unit 130 actives the input mode of the lowercase English letter font 112 to conduct judging the set of touch signals S so as to recognize the character is a lowercase English letter "v". In the meanwhile, in case the user desires to input a symbol "-", he/she only conducts writing in the symbol font input area 144, and the processing unit 130 will instantly active the input mode of the symbol font input area 144 to conduct judging the set of touch signals S so as to recognize the character is a symbol "-" (not shown). Hence, the user needn't make a switch between the English and the symbol input modes.

In another embodiment of the present invention, the processing unit 130 conducts judging an input set of touch signals to recognize a handwriting character input in one of the input modes, according to a position on which of the input areas. In the embodiment, the touch signal is the initial point p1 corresponding to FIG. 3A, and the position thereof is in the uppercase English letter font input area 141. Therefore, the processing unit 130 actives the input mode of the uppercase English letter font 111 to conduct judging the set of touch signals S so as to recognize the character is an uppercase English letter "V".

Figure 4A:
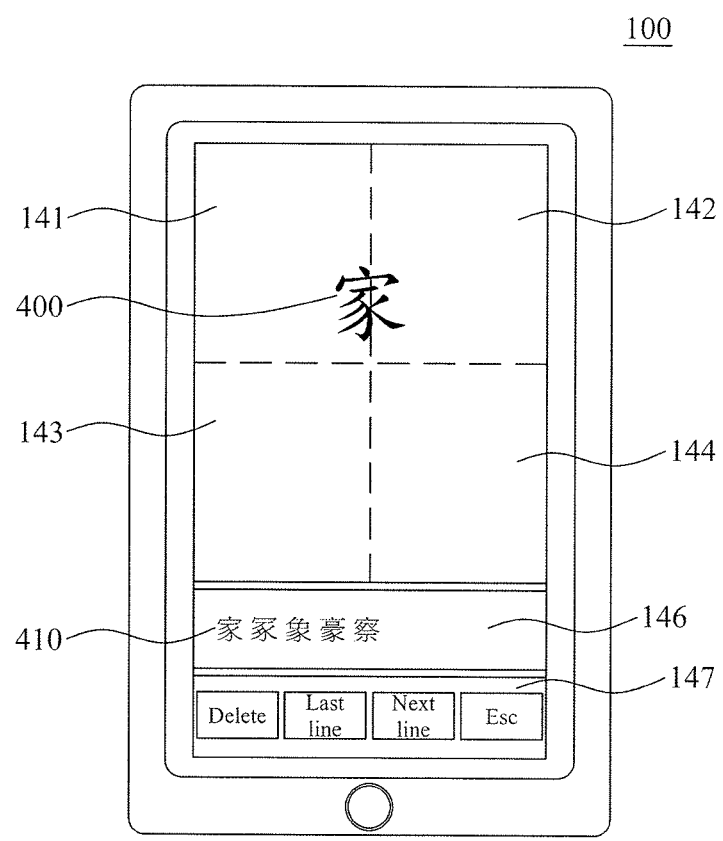
FIG. 4A is an analog view of "家" of character font according to another embodiment of the present invention.
Figure 4B:
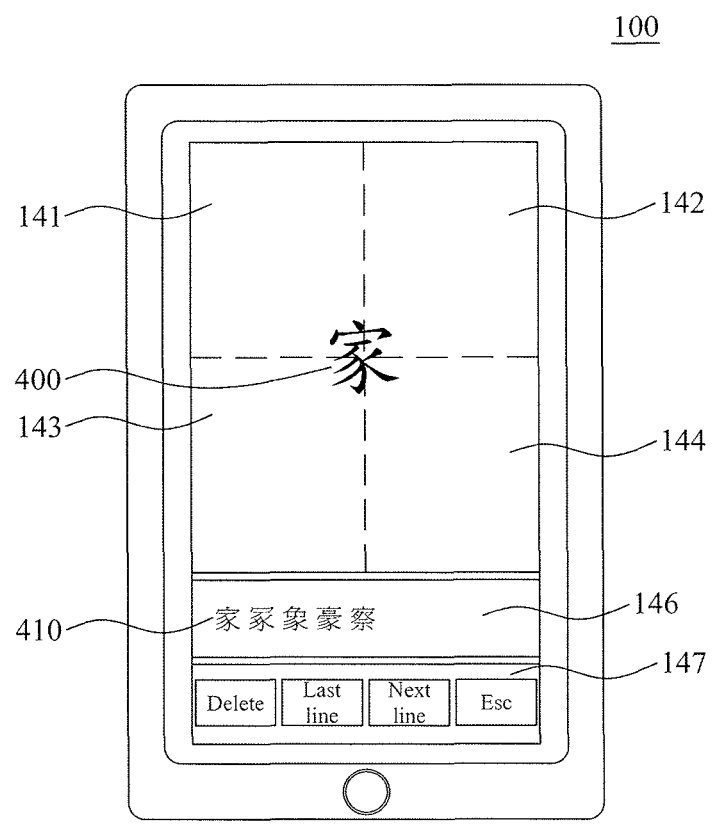
FIG. 4B is an analog view of "家" of character font according to the other embodiment of the present invention.

With reference to FIGS. 4A and 4B, FIG. 4A is an analog view of "家" of character font according to another embodiment of the present invention. In the embodiment, when the processing unit 130 judges that the set of touch signals S corresponding to the character font "家" is produced in the input areas 141-142, the processing unit 130 therefore actives a preset input mode. Consequently, the user can set the preset input mode as the most commonly used input mode, such as the Chinese input mode.

In addition, with reference to FIG. 4B, when the processing unit 130 conducts judging the set of touch signals S corresponding to the character font "家" produced in the input areas 141-142, the processing unit 130 therefore actives a preset input mode. From the above said, a conclusion can be reached that the user can set the preset input mode as the most commonly used input mode, such as the Chinese input mode; while writing in either of the two input areas, the preset input mode will active instantly to conduct judging the set of touch signals S so as to recognize the character.

Preferably, the display panel 150 of the tablet 100 has a candidate character selection area 146. The processing unit 130 further conducts displaying at least one of the recognized characters, upon recognizing the characters, on the candidate character selection area 146 of the display panel 150 in an order of descending frequencies at which the characters were input respectively. Preferably, the order is arranged by the input frequency of the character fonts. The input frequency of the character fonts, such as when the processing unit 130 is handling the selected fonts, can be obtained in accordance with the select frequency.

Figure 5:
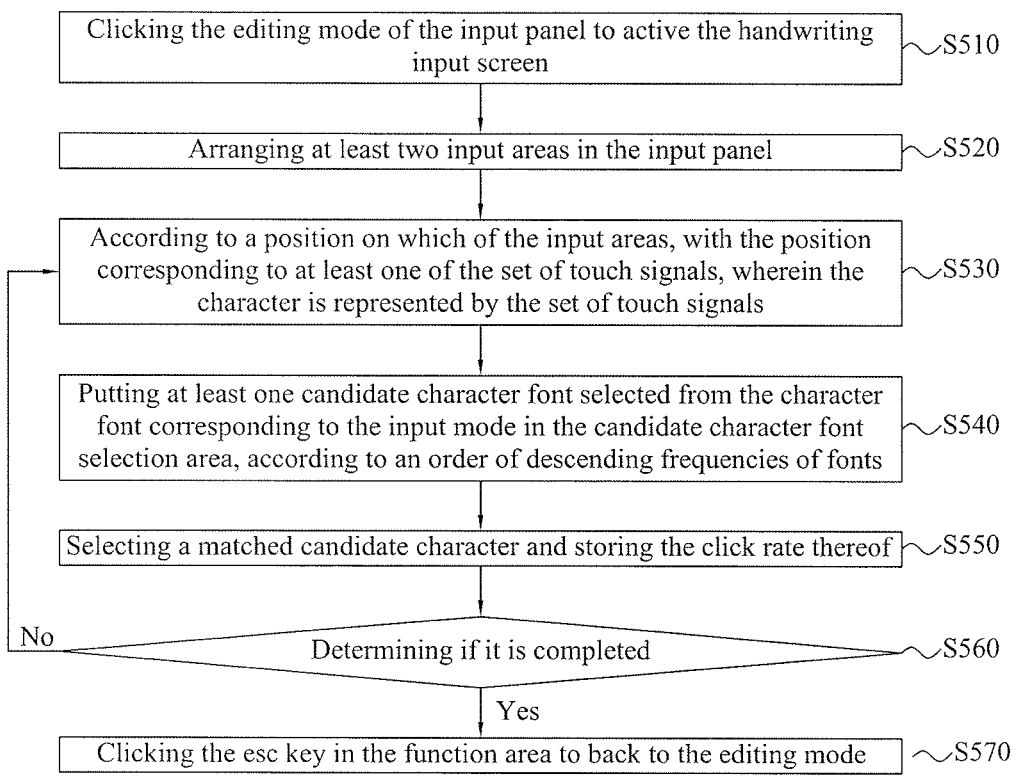
FIG. 5 is a flow chart of a handwriting recognition system with a plurality of input modes according to the present invention.

In addition, the input panel 140 further comprises a function key area 147 including an esc key 1471, a next line key 1472, a last line key 1473 and a delete key 1474, wherein, the esc key 1471 is used to escape the editing screen, the next line key 1472 and the last line key 1473 are used to switch lines to demonstrate the other candidate characters while the fonts are too many, and the delete key 1474 is used to delete the incorrect selection. With reference to FIGS. 5 and 2, firstly, the user clicks the editing mode of the input panel to active the handwriting input screen (Step 510), and arranges at least two input areas in the input panel 140 (Step 520), namely, to write a character font on the input panel 140 by handwriting or a stylus. An input set of touch signals are judged to recognize a character input by handwriting in one of the input modes, according to a position on which of the input areas, with the position corresponding to at least one of the set of touch signals, wherein the character is represented by the set of touch signals. (Step 530).

Figure 6:
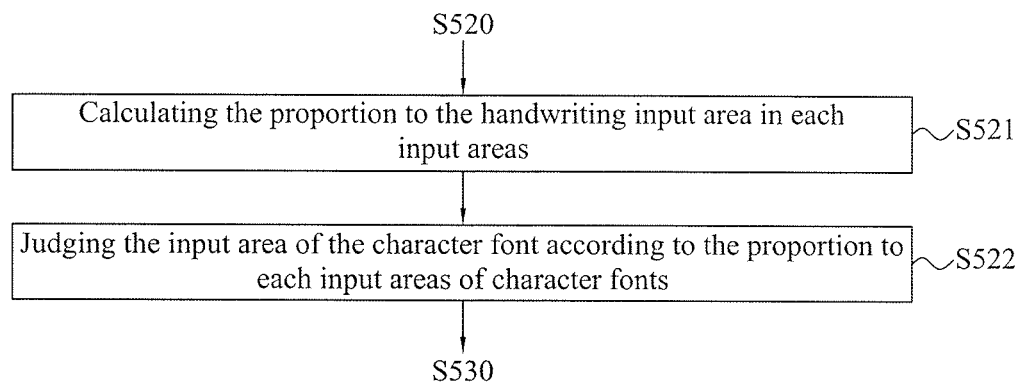
FIG. 6 is a flow chart of selecting different input modes in different input areas according to the present invention.

With reference to FIG. 6 for a detailed flow chart of step 520 to step 530, when a character font is obtained from the input panel 140, the proportion to the handwriting input area in each input areas is calculated (step 521) and the input area of the character font is judged according to the proportion to each input areas of character fonts (Step 522).

Figure 7:
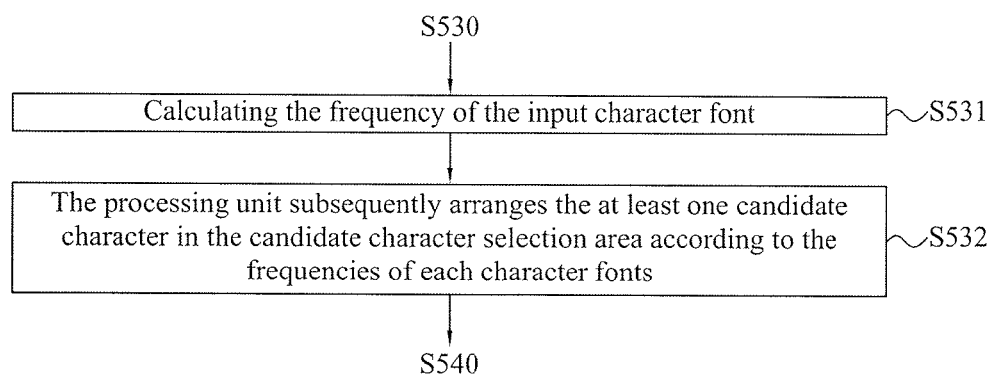
FIG. 7 is a flow chart of judging whether an input character font matches an input mode in an area according to the present invention.

Following, at least one candidate font selected from the character font corresponding to the input mode in a candidate character selection area is put according to the order of descending frequencies of fonts (Step 540). Wherein, with reference to FIG. 7, it further comprises to calculate the order of descending frequencies of fonts by the processing unit 130, and the processing unit 130 can arrange at least one candidate character in the input area according to the input frequencies of each character fonts.

As it can been seen that when inputting "v", it needs to exceed in a preset proportion and in the lowercase English letter font input area 142. As FIG. 3B shows, the initial point p1 of "v" indicates the position of the touch signal in the uppercase English letter font input area 141. However, the turning point p2 and the ending point p3 of "v" both in the lowercase English letter font input area 142, and the processing unit 130 conducts judging that "v" has a bigger proportion in the lowercase English letter font input area 142 according to the set of touch signals S. Consequently, according to the proportion to the written area, the processing unit 130 actives the corresponding input mode to conduct judging the set of touch signals S.

As a result, whether an uppercase English letter font, a lowercase English letter font, a numeral font, or a symbol font is input, the applied modes thereof are the same as the aforementioned description, and the user needn't to switch the different input modes frequently.

In addition, in terms of inputting a Chinese character font, the input mode thereof is different. The input area of a Chinese character font must be in at least two input areas. With reference to FIG. 4A, "家 400" is written in the uppercase English letter font input area 141 and the lowercase English letter font input area 142 at the same time. Hence, the result of the processing unit is to active the preset input mode.

With reference to FIG. 4B, when inputting the 家 it covers across the uppercase English letter font input area 141, the lowercase English letter font input area 142, the numeral font input area 143 and the symbol font input area 144. Consequently, the result of the processing unit 130 is to active the preset input mode to recognize the several corresponding candidate characters 410 and to show which in the candidate character selection area 146.

In other words, in case the 家 is written in at least two areas, the processing unit 130 actives the preset input mode (Chinese input mode in the embodiment) and when the 家 400 covers two or more areas of the uppercase English letter font input area 141, the lowercase English letter font input area 142, the numeral font input area 143 and the symbol font input area 144, the preset Chinese input mode actives to conduct judging the input character font and according to the frequencies of each input character fonts to show the corresponding candidate character 410 in the candidate character selection area 146.

Finally, the user judges whether the compilation in the editing area is completed (Step 560); if not, returns to Step 520; if the compilation is done, uses the esc key 1471 in the function key area 147 to escape from the editing screen. In the present invention, the input panel has a plurality of input areas for inputting data in different input modes corresponding to a plurality of character fonts, such as a Chinese character font, an uppercase English letter font, a lowercase English letter font, a numeral font, or a symbol font. As a result, the handwriting recognition system can recognize a character according to positions on which of the input areas, with the positions corresponding to at least a plurality among the set of touch signals so as to promote the recognition rate and the speed thereof.

In addition, the user needn't to keep switching the input interface as inputting the different input modes anymore. Preferably, the handwriting recognition system can store the characters or symbols which are frequently used and to recognize them in an order of descending frequencies at which the stored characters or symbols were input respectively, so that the speed for selecting correct characters or symbols to user can be accelerated.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A handwriting recognition system with a plurality of input modes, comprising:
   a storage unit for storing a plurality of character fonts, each of the character fonts corresponding to at least one of the input modes;
   a touch screen display unit, comprising an input panel, wherein the input panel has at least two input areas located thereon, each of the areas for inputting data in one of the input modes; and
   a processing unit configured to conduct judging an input set of touch signals to recognize a character input by handwriting in one of the input modes, according to a position on which of the input areas, with the position corresponding to at least one of the set of touch signals, and the character being represented by the set of touch signals;
   wherein the touch screen display unit further comprises a display panel, and the processing unit is configured to conduct displaying at least one of the recognized characters, upon recognizing the characters, on the display panel in an order of descending frequencies respectively with which the characters were input.

2. The handwriting recognition system of claim 1, wherein said at least one touch signal is first in the set of touch signals.

3. The handwriting recognition system of claim 1, wherein the processing unit is configured to recognize the character according to positions on which of the input areas, with the positions corresponding to at least a plurality among the set of touch signals.

4. The handwriting recognition system of claim 1, wherein the processing unit is configured to recognize a character input by handwriting in one of the input modes, according to at least a position on two of the input areas, with said at least a position corresponding to at least one of the set of touch signals.

5. The handwriting recognition system of claim 1, wherein the character fonts comprise a Chinese character font, an uppercase English letter font, a lowercase English letter font, a numeral font, or a symbol font.

6. A handwriting recognition method applicable to an electronic apparatus with a plurality of input modes, the electronic apparatus having a storage unit and a touch screen display unit, wherein the storage unit is for storing a plurality of character fonts, each of the character fonts corresponds to at least one of the input modes, the touch display unit has at least two input areas, each of the areas is for inputting data in one of the input modes, and the handwriting recognition method comprises:

receiving an input set of touch signals at the touch screen display unit; and judging an input set of touch signals to recognize a character input by handwriting in one of the input modes, according to a position on which of the input areas, with the position corresponding to at least one of the set of touch signals, wherein the character is represented by the set of touch signals;

wherein at least one candidate character selected from the plurality of character fonts corresponding to one of the input mode is arranged in a candidate character selection area according to an order of descending frequencies of each character fonts.

7. The handwriting recognition method of claim 6, wherein said at least one touch signal is first in the set of touch signals.

8. The handwriting recognition method of claim 6, wherein the step of judging to recognize a character further comprises recognizing a character according to positions on which of the input areas, with the positions corresponding to at least a plurality among the set of touch signals.

9. The handwriting recognition method of claim 6, wherein the step of judging to recognize a character further comprises recognizing a character input by handwriting in one of the input modes, according to at least a position on two of the input areas, with said at least a position corresponding to at least one of the set of touch signals.

* * * * *